United States Patent
Hild et al.

(10) Patent No.: US 7,781,084 B2
(45) Date of Patent: Aug. 24, 2010

(54) CATHODE HUMIDIFICATION OF A PEM FUEL CELL THROUGH EXHAUST GAS RECIRCULATION INTO A POSITIVE DISPLACEMENT COMPRESSOR

(75) Inventors: Thomas Hild, Mainz (DE); Thomas Herbig, Darmstadt (DE); Bernhard Wnendt, Russelsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1639 days.

(21) Appl. No.: 10/848,203

(22) Filed: May 18, 2004

(65) Prior Publication Data

US 2005/0260480 A1  Nov. 24, 2005

(51) Int. Cl.
*H01M 8/04* (2006.01)
*H01M 8/00* (2006.01)
(52) U.S. Cl. .............. 429/22; 429/25; 429/13; 429/17
(58) Field of Classification Search .......... 429/24, 429/22, 23, 25, 34, 13, 17
See application file for complete search history.

(56) References Cited

U.S. PATENT DOCUMENTS

| 6,815,106 B1* | 11/2004 | Salvador et al. .......... 429/22 |
| 2005/0037243 A1* | 2/2005 | Dubel et al. .......... 429/13 |

FOREIGN PATENT DOCUMENTS

| JP | 2001-345112 | * 12/2001 |
| WO | WO 03/052850 | * 6/2003 |

* cited by examiner

*Primary Examiner*—Raymond Alejandro
(74) *Attorney, Agent, or Firm*—Harness, Dickey & Pierce, P.L.C.

(57) ABSTRACT

A fuel cell stack receiving oxidant into a compressor progressively pressurizing the oxidant from an inlet pressure to a discharge pressure where a fluid connection exists between oxidant effluent from the fuel cell stack and the progressively pressurized oxidant within the compressor at an intermediate pressure between the compressor inlet pressure and the compressor discharge pressure. A pressure regulator is provided for managing pressure of the cell oxidant effluent recycle flow to the compressor, and measurements are taken of compressor power consumption and/or compressor discharge temperature, humidity, and/or pressure to further control the regulator.

20 Claims, 4 Drawing Sheets

CATHODE HUMIDIFICATION OF A PEM FUEL CELL THROUGH EXHAUST GAS RECIRCULATION INTO A POSITIVE DISPLACEMENT COMPRESSOR

FIELD OF THE INVENTION

The present invention relates to fuel cell power systems, and more particularly to methods and mechanizations for humidifying the oxidant gas feed to a fuel cell stack of the fuel cell power system.

BACKGROUND OF THE INVENTION

Fuel cell power systems convert a fuel and an oxidant to electricity. One fuel cell power system type of keen interest employs use of a proton exchange membrane (hereinafter "PEM") to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

In a typical fuel cell assembly (stack) within a fuel cell power system, individual fuel cells have flow fields with inlets to fluid manifolds; these collectively provide channels for the various reactant and cooling fluids reacted in the stack to flow into each cell. Gas diffusion assemblies then provide a final fluid conduit to further distribute reactant fluids from the flow field space to the reactive anode and cathode.

Effective operation of a PEM requires a balanced provision of sufficient water in the polymer of a PEM to maintain its proton conductivity while maintaining the flow field channels and gas diffusion assemblies in non-flooded operational states. In this regard, the oxidant, typically oxygen or oxygen-containing air, is supplied to the cathode where it reacts with hydrogen cations that have crossed the proton exchange membrane and electrons from an external circuit. Thus, the fuel cell generates both electricity and water through the electrochemical reaction, and the water is removed with the cathode effluent, dehydrating the PEM of the fuel cell unless the water is otherwise replaced. It is also to be noted that the inlet air flow rate to the cathode will generally evaporate water from the proton exchange membrane at an even higher rate than the rate of water generation (and commensurate dehydration of the PEM) via reaction at the cathode.

When hydrated, the polymeric proton exchange membrane possesses "acidic" properties that provide a medium for conducting protons from the anode to the cathode of the fuel cell. However, if the proton exchange membrane is not sufficiently hydrated, the "acidic" character diminishes, with commensurate diminishment of the desired electrochemical reaction of the cell. Hydration of a fuel cell PEM also assists in temperature control within the fuel cell, insofar as the heat capacity of water provides a heat sink. Cooling of a fuel cell is assisted by the introduction of liquid water into the feed gases, especially when heat from the cell is used to provide the heat needed for evaporation.

In addition to issues in water balance and cell hydration, another issue in fuel cell design for use in vehicles is directed to the efficient use of space. In this regard, space in a vehicle is precious and approaches to design which minimize the permanent use of space in the vehicle clearly benefit the utility of the vehicle. This leads toward a desire to integrate the humidifying system into each of the fuel cells.

The need for efficiency in operation and for greater integration in cooling and humidification to achieve efficient space utilization in fuel cell systems continues to be strongly felt. Therefore, a need exists for a fuel cell power system which provides humidification of the feed gases (especially the oxidant), and in such a way that a minimum of space is needed for the humidification operation. The present invention is directed to fulfilling this need.

SUMMARY OF THE INVENTION

The present invention is for a fuel cell power system having a fuel cell stack receiving oxidant into an oxidant inlet from a compressor progressively pressurizing the oxidant from an inlet pressure to a discharge pressure where a (recycle) fluid connection exists between oxidant effluent from the fuel cell and the progressively pressurized oxidant within the compressor at an intermediate pressure not greater than the oxidant effluent pressure and between the compressor inlet pressure and the compressor discharge pressure. In one aspect of the invention, the fluid connection to a compressor is made through the compressor housing into the interior pressurization space of the compressor.

In another aspect of the invention, a pressure regulator is provided to manage the flow and pressure of the oxidant effluent into the fluid connection to the compressor. Measurements are taken of any of compressor power consumption, compressor discharge temperature, humidity, and/or pressure, and used to control the regulator and/or compressor.

In another aspect of the invention, a control computer coordinates flows in the fuel power system in response to the measurements of any of compressor power consumption, compressor discharge temperature, humidity, and/or pressure.

In considering benefits from the invention, the integration of humidification operations with effective recycle of humidity from the fuel cell effluent along with the inherent mixing provided in the internal environment of a compressor provides a basis for volume, weight, and cost reduction in a fuel cell system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The invention is further understood with reference to a generic fuel cell power system. Therefore, before further describing the invention, a general overview of the power system within which the improved fuel cells of the invention operate is provided. In the system, a hydrocarbon fuel is processed in a fuel processor, for example, by reformation and partial oxidation processes, to produce a reformate gas which has a relatively high hydrogen content on a volume or molar basis. Therefore, reference is made to hydrogen-containing as having relatively high hydrogen content. The invention is hereafter described in the context of a fuel cell fueled by an $H_2$-containing reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons.

Figure 1:
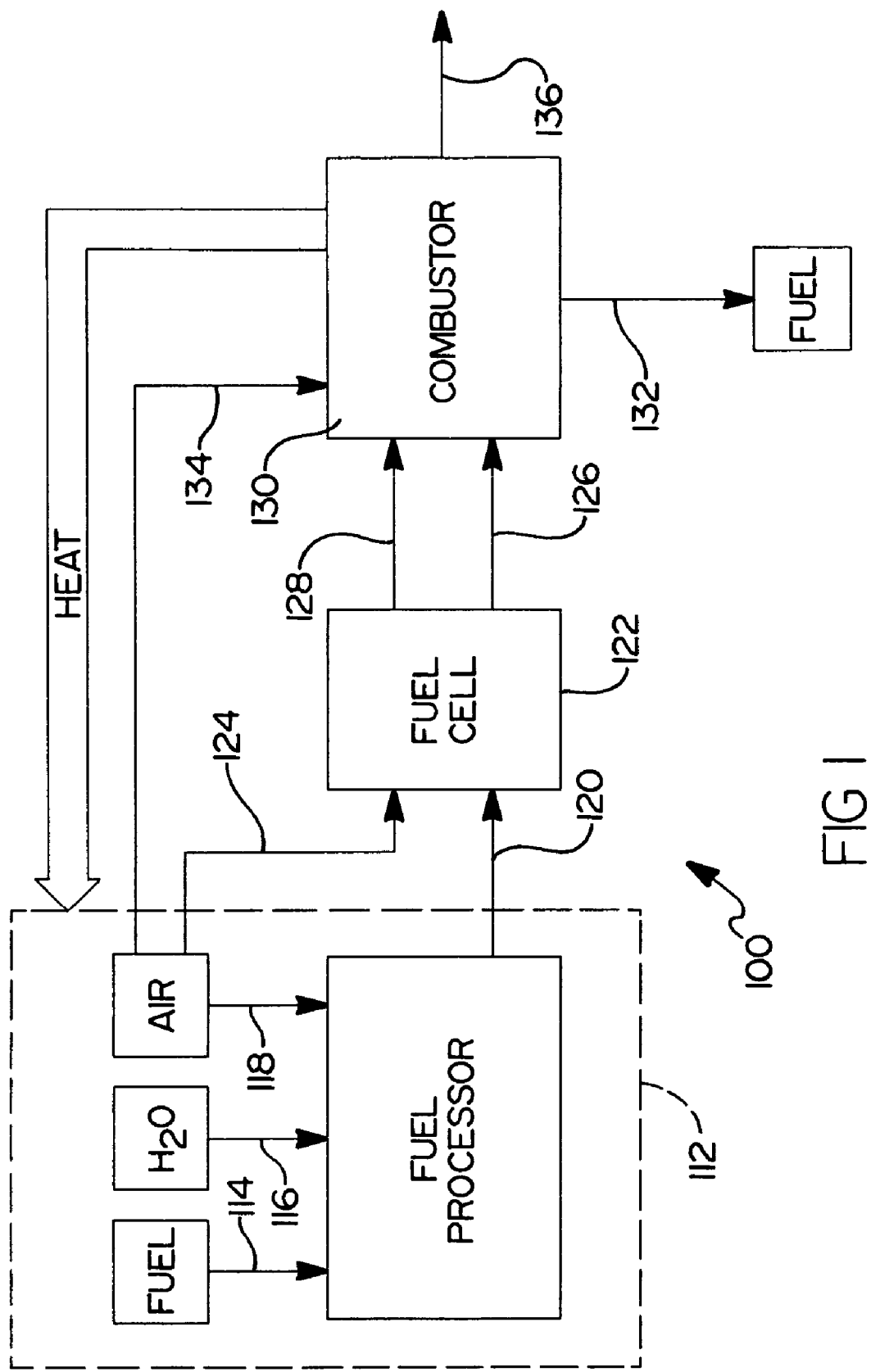
FIG. 1 shows a fuel cell power system overview.

As shown in FIG. 1, a fuel cell power system 100 includes a fuel processor 112 for catalytically reacting a reformable hydrocarbon fuel stream 114, and water in the form of steam from a water stream 116. In some fuel processors, air is also used in a combination preferential oxidation/steam reforming reaction. In this case, fuel processor 112 also receives an air stream 118. The fuel processor 112 contains one or more reactors wherein the reformable hydrocarbon fuel in stream 114 undergoes dissociation in the presence of steam in stream 116 and air in stream 118 to produce the hydrogen-containing reformate exhausted from fuel processor 112 in reformate stream 120. Fuel processor 112 typically also includes one or more downstream reactors, such as water-gas shift (WGS) and/or preferential oxidizer (PrOx) reactors that are used to reduce the level of carbon monoxide in reformate stream 120 to acceptable levels, for example, below 20 ppm. $H_2$-containing reformate 120 is fed through the anode chamber of fuel cell stack system 122. At the same time, oxygen in the form of air in stream 124 is fed into the cathode chamber of fuel cell stack system 122. The hydrogen from reformate stream 120 and the oxygen from oxidant stream 124 react in fuel cell stack system 122 to produce electricity.

Anode exhaust (or effluent) 126 from the anode side of fuel cell stack system 122 contains some unreacted hydrogen. Cathode exhaust (or effluent) 128 from the cathode side of fuel cell stack system 122 may contain some unreacted oxygen. These unreacted gases represent additional energy recovered in combustor 130, in the form of thermal energy, for various heat requirements within power system 100.

Specifically, a hydrocarbon fuel 132 and/or anode effluent 126 are combusted, catalytically or thermally, in combustor 130 with oxygen provided to combustor 130 either from air in stream 134 or from cathode effluent stream 128, depending on power system 100 operating conditions. Combustor 130 discharges exhaust stream 136 to the environment, and the heat generated thereby is directed to fuel processor 112 as needed.

Figure 2:
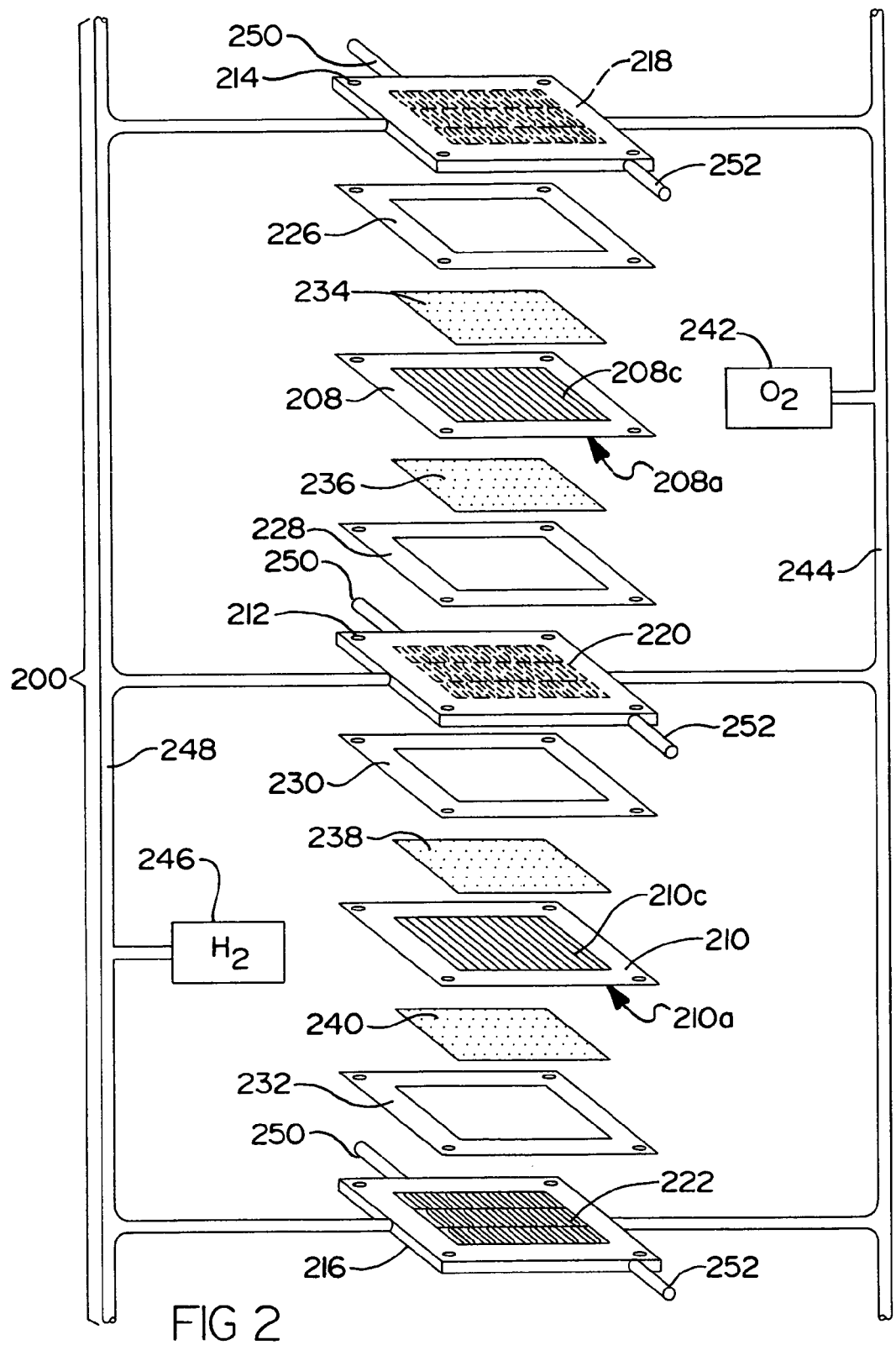
FIG. 2 shows detail in a portion of a PEM fuel cell stack within the fuel cell stack assembly of the fuel cell power system of FIG. 1.

Turning now to FIG. 2, a partial PEM fuel cell stack 200 of fuel cell stack system 122 is schematically depicted as having a pair of membrane electrode assemblies (MEAs) 208 and 210 separated from each other by a non-porous, electrically-conductive bipolar plate 212. Each of MEAs 208, 210 have a cathode face 208c, 210c and an anode face 208a, 210a. MEAs 208, 210 and bipolar plate 212 are stacked together between non-porous, electrically-conductive plates 214 and 216. Plates 212, 214, 216 each include respective flow fields 218, 220, 222 established from a plurality of flow channels formed in the faces of the plates for distributing fuel and oxidant gases (i.e., $H_2$ & $O_2$) to the reactive faces of MEAs 208, 210. Nonconductive gaskets or seals 226, 228, 230, 232 provide sealing and electrical insulation between the several plates of fuel cell stack 200.

Porous, gas permeable, electrically conductive sheets 234, 236, 238, 240 press up against the electrode faces of MEAs 208, 210 and serve as primary current collectors for the respective electrodes. Primary current collectors 234, 236, 238, 240 also provide mechanical supports for MEAs 208, 210, especially at locations where the MEAs are otherwise unsupported in the flow field. Plate 214 presses up against primary current collector 234 on cathode face 208c of MEA 208, bipolar plate 216 presses up against primary current collector 240 on anode face 210a of MEA 210, and bipolar plate 212 presses up against primary current collector 236 on anode face 208a of MEA 208 and against primary current collector 238 on cathode face 210c of MEA 210.

An oxidant gas such as air/oxygen is supplied to the cathode side of fuel cell stack 200 from air source 242 via appropriate supply plumbing 244. In a preferred embodiment, air is supplied to the cathode side from the ambient via a compressor. A fuel such as hydrogen is supplied to the anode side of fuel cell 200 from a fuel source 246 via appropriate supply plumbing 248. In a preferred embodiment, the anode feed stream is supplied from a reformer after catalytically dissociating hydrogen from hydrocarbon fuel as previously described herein.

Exhaust plumbing (not shown) for both the $H_2$ and $O_2$/air sides of MEAs 208, 210 is also provided for removing anode effluent from the anode flow field and the cathode effluent from the cathode flow field. Coolant plumbing 250, 252 is provided for supplying and exhausting liquid coolant to plates 214, 216, as needed. It is to be noted that fuel cell stack 200 shows two fuel cells with plate 212 being shared between the two fuel cells and plates 214, 216.

Figure 3:
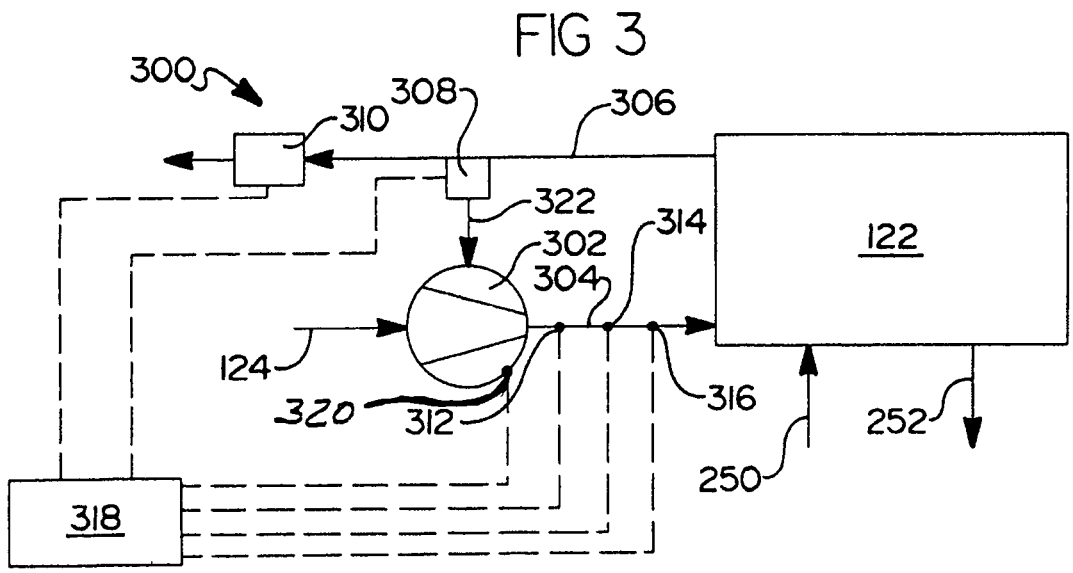
FIG. 3 shows a block flow diagram of the fuel cell stack of FIG. 2 with a compressor for pressurizing oxidant feed gas, an oxidant recycle stream, and a control computer.

Turning now to FIG. 3, fuel cell stack 122 and line 124 are reprised from FIG. 1 in a schematic diagram 300 with the further detail of compressor 302 for pressurizing oxidant feed gas in line 124. Schematic diagram 300 also shows oxidant recycle stream 322 and control computer 318. Coolant lines 250, 252 from fuel cell stack 200 are reprised from FIG. 2. Coolant in these lines is preferably controlled to maintain humidified (at a relative humidity of about 100%) oxidant effluent discharged from fuel cell stack system 122 in line 306 at a temperature of between 80 and 85 degrees Celsius.

Oxidant feed gas in line 124 is pressurized by compressor 302 to provide pressurized oxidant feed in line 304 at a compressor discharge pressure higher than the pressure within line 124 at the inlet to compressor 302.

Discharge pressure on pressurized oxidant feed 304 is determined from the pressure drop across fuel cell stack system 122 and also from the pressure drop across backpressure regulator 310 and pressure regulator 308. Oxidant effluent discharged from fuel cell stack system 122 in line 306 provides a recycled oxidant feed to line 322 which is in fluid communication with the pressurized fluid within compressor 302. In this regard, an intermediate inlet in the housing of compressor 302 provides a fluid communication path between line 322 and the compression space defined within compressor 302.

Oxidant feed in line 304 is monitored for temperature, pressure, and humidity by suitable sensors 312, 314, and 316 respectively. Similarly, compressor 302 is monitored for power by a suitable sensor 320 such as a current sensor. Signal lines connect temperature sensor 312, pressure sensor 314, and humidity sensor 316, pressure regulator 308, power sensor 320, and backpressure regulator 310 to control computer 318 so that logic within control computer 318 controls pressure regulator 308 and backpressure regulator 310 to provide a desired set of fuel cell system aspects as measured by temperature measurement 312, pressure measurement 314, humidity measurement 316, and power measurement 320.

Figure 4:
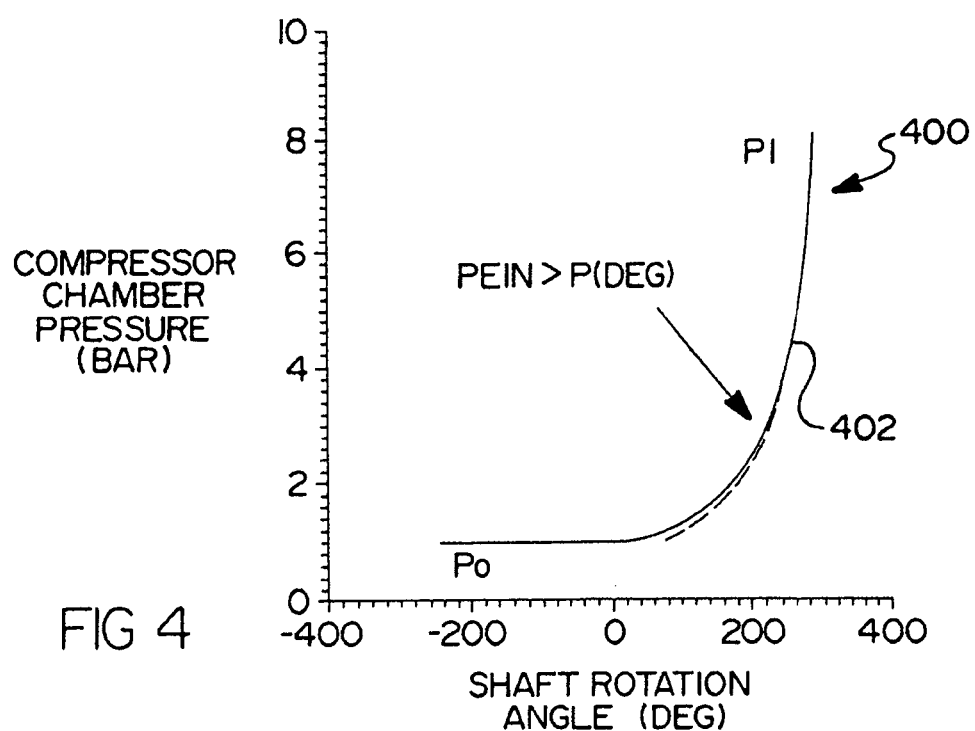
FIG. 4 presents a positive displacement compressor pressurization chart.

Turning now to FIG. 4, a positive displacement compressor pressurization graph 400 is presented for compressor 302. Graph 400 shows the progressive pressurization of oxidant feed in line 124 from a compressor inlet pressure ($P_0$) to a compressor discharge pressure (as measured by sensor 314) at $P_1$ through use of compressor 302. Line 322 monitors the intermediate pressure of compressor 302 so that pressure within compressor 302 and is represented by curve 402. In this regard, pressure curve 402 represents an intermediate pressure not greater than the oxidant effluent pressure in line 306 and between the inlet pressure of compressor 302 and the discharge pressure of compressor 302 (at sensor 314).

Figure 5A:
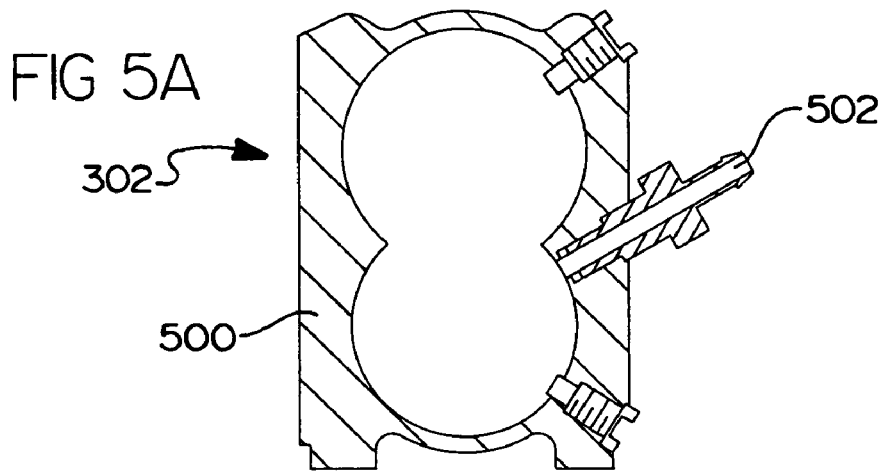
FIGS. 5*a* and 5*b* present two views of a screw compressor with a recycle gas connection.
Figure 5B:
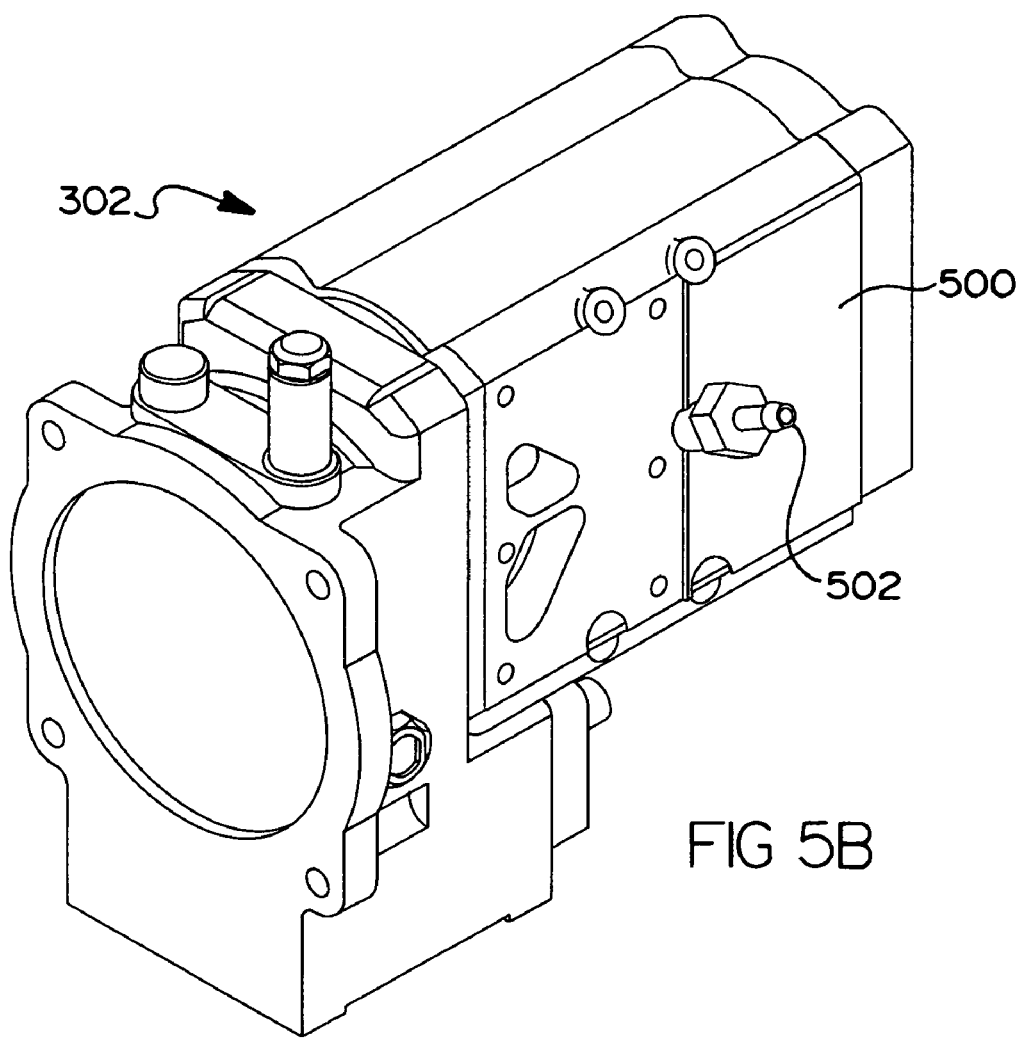

Turning now to FIG. 5A, connection 502 is shown for fluidly interconnecting line 322 through housing 500 of compressor 302 so that, in operation of compressor 302, the pressure within compressor 302 is at an intermediate pressure at the point of insertion as represented in curve 402. FIG. 5B shows three-dimensional view of housing 500 of a screw compressor 302 with the recycle gas connection 502 reprised to show the axial insertion position so that an intermediate pressure not greater than the oxidant effluent pressure of line 306 and between the compressor 302 inlet pressure $P_0$ of line 124 and the compressor 302 discharge pressure $P_1$ of line 304 (as measured by pressure sensor 314) is achieved. While the point of insertion has been shown to be located generally in the middle of pump housing 500, a skilled practitioner will recognize that an exact location of the point of insertion may vary depending upon the operating condition of the system including the compressor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell power system comprising:
   a compressor having at least two gas inlets, a compression chamber, a discharge and a reactant feed gas pumped therethrough;
   a fuel cell stack receiving said reactant feed gas in a stack inlet and discharging a reactant gas effluent from a stack outlet;
   a fluid connection between said stack outlet and said compression chamber that delivers a pressurized recycle gas stream comprising a portion of said reactant effluent gas to one of said at least two gas inlets; and
   a pressure regulator disposed in said fluid connection for regulating a pressure of said pressurized recycle gas stream as it is delivered to one of said at least two gas inlets.

2. The fuel cell power system of claim 1 wherein said compressor pressurizes said reactant feed gas from a compressor inlet pressure to a compressor discharge pressure which is in excess of said compressor inlet pressure, and wherein an intermediate pressure of said pressurized recycle gas stream as it is delivered to said compressor at said location is not greater than an effluent pressure of said reactant effluent and is between said compressor inlet pressure and said compressor discharge pressure.

3. The fuel cell power system of claim 1 further comprising a temperature sensor measuring a temperature of said reactant feed gas and generating a control signal which is used to control said pressure regulator.

4. The fuel cell power system of claim 1 further comprising a humidity sensor measuring a relative humidity of said reactant feed gas and generating a control signal which is used to control said pressure regulator.

5. The fuel cell power system of claim 1 further comprising a power consumption sensor measuring a current of said compressor and generating a control signal which is used to control said pressure regulator.

6. The fuel cell power system of claim 1 further comprising a controller to control said pressure regulator responsive to a control signal based on at least one of a temperature measurement of said reactant feed gas, a humidity measurement of said reactant feed gas, and a power consumption measurement of said compressor in operation.

7. The fuel cell power system of claim 2 wherein said compressor is a positive displacement compressor.

8. The fuel cell power system of claim 7 wherein said compressor is a screw compressor having a housing, a compressor screw, and a compression space defined therebetween, and wherein said fluid connection is into said compression space.

9. The fuel cell power system of claim 1 wherein said reactant feed gas is a cathode feed gas and said pressurized recycle gas stream is a humidified cathode effluent gas.

10. A method of operating a fuel cell power system comprising:
    moving a reactant feed gas through a compressor having an inlet and a discharge;
    directing said reactant feed gas from said discharge through a fuel cell stack;
    discharging a reactant gas effluent from said fuel cell stack; and
    re-circulating at least a portion of said reactant gas effluent in a pressurized gaseous state to a location within a compression chamber of said compressor which is intermediate said inlet and said discharge, wherein said re-circulated reactant gas effluent is maintained at an intermediate pressure greater than an inlet pressure of said compressor and less than a discharge pressure of said compressor.

11. The method of claim 10 wherein said compressor compresses said reactant gas from a compressor inlet pressure to a compressor discharge pressure which is in excess of said compressor inlet pressure, and wherein said intermediate pressure at said location is not greater than an effluent pressure of said reactant effluent and is between said compressor inlet pressure and said compressor discharge pressure.

12. The method of claim 11 further comprising regulating a pressure of said reactant gas effluent so that said reactant effluent pressure is reduced to said intermediate pressure.

13. The method of claim 12 wherein regulating pressure of said reactant gas effluent further comprises measuring a temperature of said reactant feed gas and regulating said pressure of said reactant gas effluent based on said temperature.

14. The method of claim 12 wherein regulating pressure of said reactant gas effluent further comprises measuring a relative humidity of said reactant feed gas and regulating said pressure of said reactant gas effluent based on said relative humidity.

15. The method of claim 12 wherein said regulating pressure of said reactant gas effluent further comprises measuring a power consumption of said compressor in operation and regulating said pressure of said reactant gas effluent based on said power consumption.

16. The method of claim 12 wherein said regulating pressure of said reactant gas effluent further comprises measuring any of a temperature of said reactant feed gas, a humidity of said reactant feed gas, and a power consumption of said compressor in operation and generating a control signal therefrom, and regulating said pressure of said reactant gas effluent based on said control signal.

17. The method of claim 10 wherein said reactant feed gas comprises a cathode feed gas.

18. A fuel cell power system comprising:
a compressor having a reactant feed inlet, a compression chamber volume, and a discharge, wherein a reactant feed gas is pumped therethrough, said compressor compressing said reactant feed gas from said a compressor inlet pressure to a compressor discharge pressure which is in excess of said compressor inlet pressure;
a fuel cell stack receiving said reactant feed gas in a stack inlet and discharging a reactant effluent from a stack outlet;
a fluid connection between said stack outlet and a gas inlet of said compressor, wherein said gas inlet is connected to a compression chamber volume located intermediate said reactant feed inlet and said outlet, for recirculating a pressurized recycle gas stream comprising at least a portion of said reactant effluent;
a pressure regulator disposed in said fluid connection for regulating a pressure of said pressurized recycle gas stream; and
at least one sensor measuring a physical property of said reaction feed gas and generating a control signal which is used to control said pressure of said recycle gas stream.

19. The fuel cell system of claim 18 further comprising a controller to control said pressure regulator responsive to said control signal and a power consumption measurement of said compressor in operation.

20. The fuel cell system of claim 18 wherein said sensor is one of a temperature sensor, a flow rate sensor, a humidity sensor and a power consumption sensor.

* * * * *